Dec. 4, 1934.   R. C. ZUCKERMAN   1,983,060
WATER JUG SUPPORT FOR MOTOR VEHICLES
Filed July 24, 1933
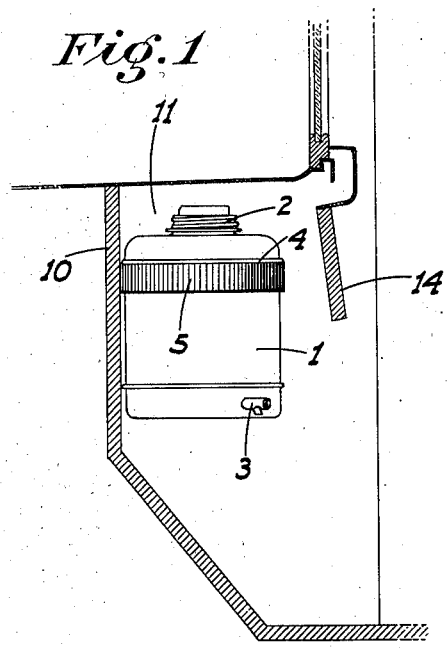
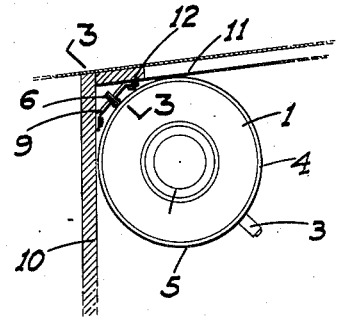
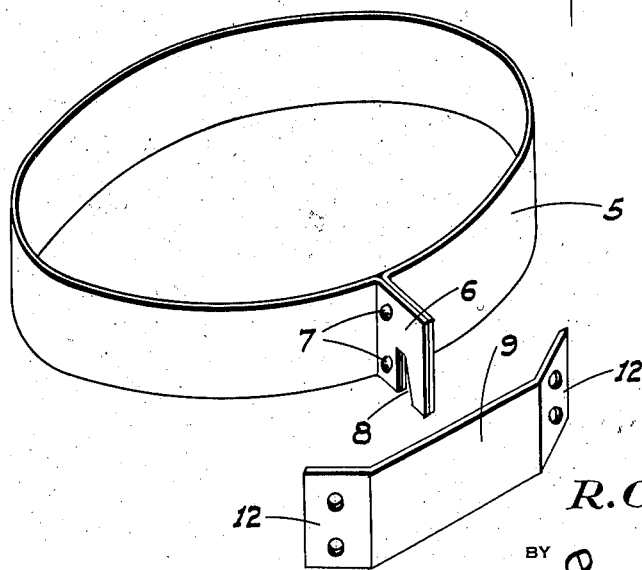
INVENTOR
R. C. Zuckerman
BY
ATTORNEY Patented Dec. 4, 1934

1,983,060

UNITED STATES PATENT OFFICE 1,983,060

WATER JUG SUPPORT FOR MOTOR VEHICLES

Roscoe C. Zuckerman, Stockton, Calif.

Application July 24, 1933, Serial No. 681,912

3 Claims. (Cl. 248—20)

This invention relates to motor vehicle accessories and particularly to a supporting means for the relatively large vacuum jugs in which cold water is carried.

When going on a long trip in a motor vehicle in hot weather, or when traveling in isolated sections, the wise motorist takes a jug of water with him in one of the large modern vacuum jugs. My invention particularly deals with jugs of this general character which are provided with a dispensing faucet near the bottom. Such jugs however are relatively heavy and awkward to handle for the purpose of pouring the contents, especially when the vehicle is in motion, and must be lifted or raised from the floor so that the dispensing faucet is raised accordingly the necessary distance. Also the driver, if he is alone, cannot take a drink without stopping the car.

The principal object of my invention is to avoid the present inconvenience incident to dispensing water from such jugs by providing a means for supporting a jug of the faucet type in a rigid position in the driver's compartment of a car so that said jug clears the floor a sufficient distance to enable a glass or cup to be placed under the faucet. At the same time the jug, while convenient to the driver or other passenger in the front compartment, is out of the way and does not interfere with the feet of any person, or with the freedom of entering or leaving the car. Also a supporting means is arranged so that the jug may be instantly removed for filling when necessary and as quickly replaced in a supported position.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Fig. 1 is a fragmentary sectional elevation of the driver's compartment of a motor vehicle showing a jug supported in place by my improved device.

Fig. 2 is a top plan view of the same.

Fig. 3 is an enlarged cross section on the line 3—3 of Fig. 2.

Fig. 4 is a perspective view of the supporting unit detached.

Referring now more particularly to the characters of reference on the drawing, the numeral 1 denotes a vacuum jug of conventional character having a filling cap 2 on top and a faucet 3 projecting from one side near the bottom. The casing of the jug is also formed with a bead 4 about the same near the top.

The supporting structure includes a circular metal band 5 having initially separated ends which are bent radially of the band to form ears 6. The band is placed about the jug immediately under the bead so as to engage the same and is clamped about the jug by rivets 7 through the ears, which rivets also maintain the ears close together, as shown so that they form in effect a unitary hanger lug.

A V-shaped notch 8 is cut vertically in the lug from its lower end, the side of the notch furthest from the jug having an upward slope toward the same as shown in Fig. 3. The notch is adapted to fit over a bracket plate 9 set on edge and which extends diagonally and symmetrically of the corner between the dash board 10 and the right hand side wall 11 of the motor vehicle inside the driver's compartment. This plate has orificed end ears 12 to abut against said dash board and side wall, to which said ears are secured by bolts 13 or the like passing through the ear orifices.

The bracket is mounted at such a height as to permit upward disengaging movement of the hanger lug without the jug striking the cowling of the car. In this manner the jug is supported in suspended relation to the floor of the car at one side of the compartment well clear of the feet of the occupants and behind the instrument panel 14 so that it is inconspicuous and yet readily useable. The band is preferably mounted on the jug so that the faucet is diametrally alined with the hanger lug so that said faucet is in the plane of a line bisecting the corner angle and in projecting relationship toward the driver where he can readily reach it from his seat. The length of the bracket between the end ears thereof, and the radial length of the hanger lug are so related to the angle of the corner and to the diameter of the jug that when the notch 8 is engaged with the bracket and the jug is supported, the sides of the jug will engage the dash board 10 and wall 11 so that the jug is held in a vertical position without undue strain on the bracket. The V form of the notch not only facilitates the initial locating of the same with the bracket plate, but on account of the particular slope of the back side of the notch as described, the jug is drawn toward the dash board 10 and wall 11 as the lug descends on the bracket, thus causing the jug to be firmly clamped against said wall surfaces and positively prevent vibration and rattling of the jug.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. Means for mounting a jug in a corner between vertical walls and in suspended relation to the floor comprising a bracket plate secured to said walls and extending diagonally on edge across the corner, and means mounted on the jug for supporting engagement with said plate and arranged to cause the jug to be engaged at circumferentially spaced points with the walls.

2. In combination with a pair of walls disposed in angular relation to each other, and a cylindrical receptacle, a bracket supported by the walls and extending across the corner therebetween, and means on the receptacle to detachably engage said bracket and arranged, with said bracket, to both support the receptacle and hold the same at circumferentially spaced points against both walls whereby to prevent possible swaying and rattling of the receptacle.

3. In combination with a pair of walls disposed in angular relation to each other, and a cylindrical receptacle, a bracket supported by the walls and extending across the corner therebetween, and a vertical lug rigid with and projecting radially from the receptacle, said lug having a notch cut up from the bottom thereof to straddle the bracket and the outermost edge of the notch having a converging slope to its upper end whereby as the notch descends onto the bracket the receptacle will be shifted inwardly of the corner; the bracket being so disposed that with such shifting, the receptacle at circumferentially spaced points will become snugly engaged with both walls.

ROSCOE C. ZUCKERMAN.